United States Patent [19]
Kearful

[11] Patent Number: 5,669,592
[45] Date of Patent: Sep. 23, 1997

[54] CAMERA SUPPORT

[76] Inventor: Robert G. Kearful, 398 Grover Cleveland Hwy., Amherst, N.Y. 14226

[21] Appl. No.: 533,680

[22] Filed: Sep. 26, 1995

[51] Int. Cl.$^6$ .................................................. A47B 96/06
[52] U.S. Cl. ..................... 248/217.4; 248/546; 411/389; 411/397; 411/401
[58] Field of Search ................... 248/217.4, 546; 411/389, 388, 397, 401; 352/243; 354/81; 81/177.5

[56] References Cited

U.S. PATENT DOCUMENTS

| 4,079,908 | 3/1978 | Davis | 248/156 |
| 4,108,560 | 8/1978 | Minogue | 411/389 X |
| 4,636,125 | 1/1987 | Burgard | 411/389 |

FOREIGN PATENT DOCUMENTS

| 55910 | 2/1935 | Norway | 248/217.4 |
| 14749 | 7/1902 | United Kingdom | 248/217.4 |

OTHER PUBLICATIONS

"Screaming Eagle ®Camera Mount", Screaming Eagle 1995 Catalog, 1995, p. 11.

*Primary Examiner*—Ramon O. Ramirez
*Attorney, Agent, or Firm*—Howard & Howard

[57] ABSTRACT

A camera support (10) for supporting a camera (12) having a threaded opening in an exterior wall thereof. The support (10) comprises a shaft (15) having first (16) and second (18) ends and a longitudinal axis extending therebetween. Course self tapping anchor threads (20) are disposed on the first end (16) of the shaft (15) for threadingly engaging a support structure (22). Machine-type support threads (24) are disposed on the second end (18) of the shaft (15) for threadingly engaging the threaded opening in the camera (12). A handle (26) extends transversely to the axis of the shaft (15) for manually rotating the anchor threads (20) into the support structure (22).

5 Claims, 3 Drawing Sheets

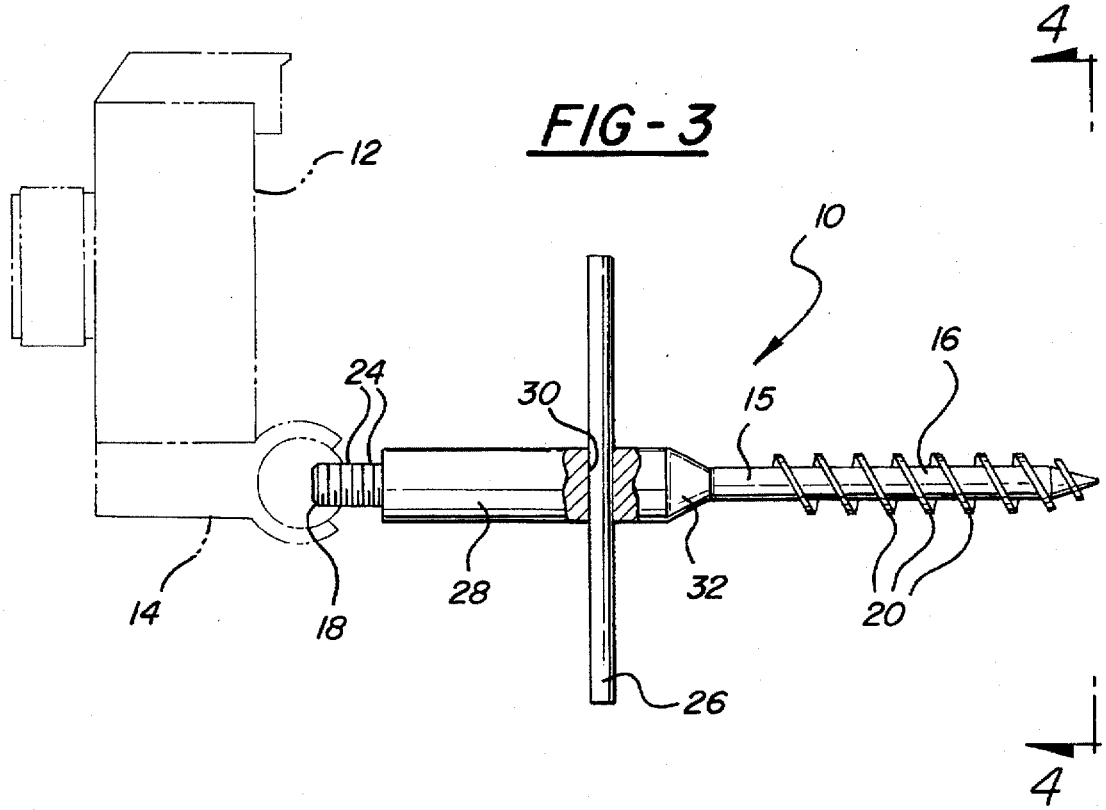
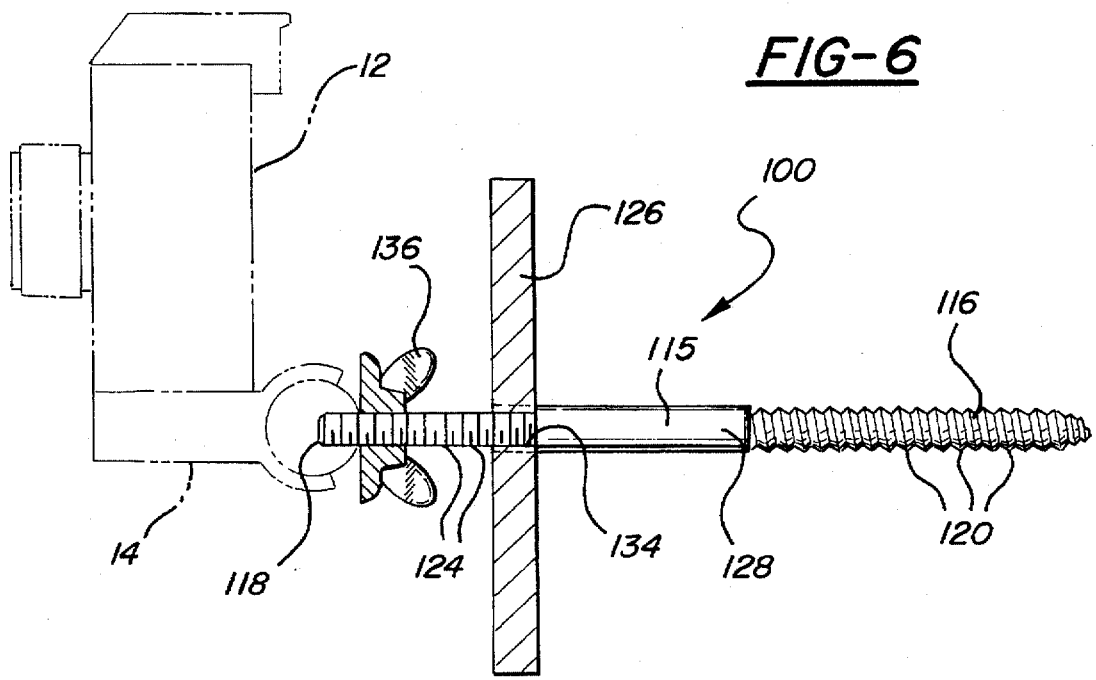

CAMERA SUPPORT

TECHNICAL FIELD

The subject invention relates to camera supports and, more specifically, to a support which threadingly engages and supports a camera on a support structure.

BACKGROUND ART

Portable cameras, both of the still and movie types, commonly have a threaded opening in the exterior wall to receive a camera support. Camera supports typically threadingly engage the camera and support the camera to a support structure. Among the numerous camera supports available, the most common is the tripod. Although tripods are available in various shapes and sizes, they are usually cumbersome and bulky.

Hence, there is need for a camera support that is uncomplicated, requires no assembly, and can mount the camera to various support structures. An example of a camera support is shown in U.S. Pat. No. 4,079,908 to F. W. Davis. The Davis '908 patent discloses a camera support having a knife portion for supporting a camera and engaging a support structure. Also known in the art, is a camera support that has an offset U-shaped shaft and a coarsely threaded projection located at one end. Camera support threads are located at the other end of the shaft and are perpendicular to the threaded projection. These supports, however, do not provide a sufficient mechanical advantage and are inadequate for supporting a camera in dense material, i.e. hard wood or rock. Therefore, the necessity for a camera support which also includes a significant mechanical advantage for manually attaching the support to a support structure is apparent.

SUMMARY OF THE INVENTION

The disclosed embodiment of the subject invention includes a camera support for supporting a camera having a threaded opening in an exterior wall thereof. The camera support comprises a shaft having first and second ends and a longitudinal axis extending therebetween. Self tapping anchor threads are disposed on the first end of the shaft and extend along the axis for threadingly engaging a support structure. Machine-type support threads are disposed on the second end of the shaft and also extend along the axis for threadingly engaging the threaded opening in the camera. The camera support is characterized by a handle extending transversely to opposing sides of the axis of the shaft for manually rotating and tapping the anchor threads into the support structure.

BRIEF DESCRIPTION OF THE DRAWINGS

Other advantages of the present invention will become readily appreciated as the same becomes better understood by reference to the following detailed description when considered in connection with the accompanying drawings wherein:

FIG. 3 is a side elevational view, partially broken away and in cross-section, of the subject invention;

FIG. 6 is a side elevational view, partially in cross-section, of an alternative embodiment of the subject invention.

DETAILED DESCRIPTION OF PREFERRED EMBODIMENT

Figure 1:
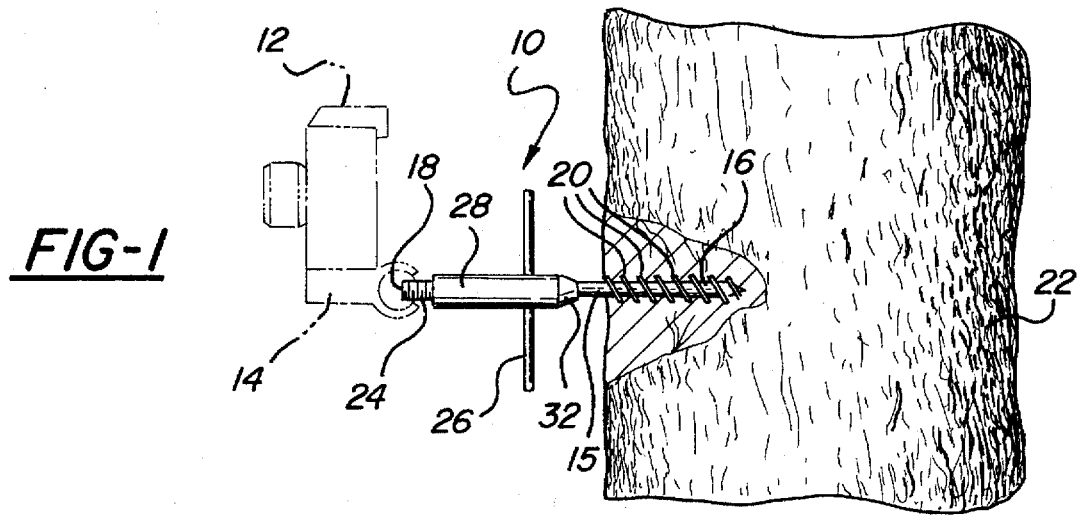
FIG. 1 is an environmental view showing the support of the subject invention supporting a camera on a support structure.
Figure 2:
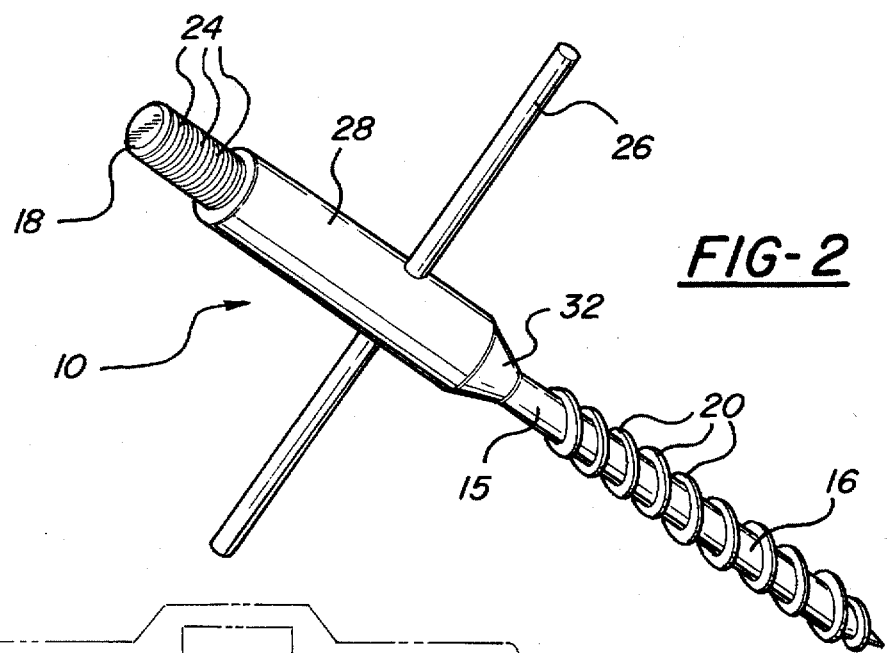
FIG. 2 is a perspective view of the subject invention.
Figure 4:
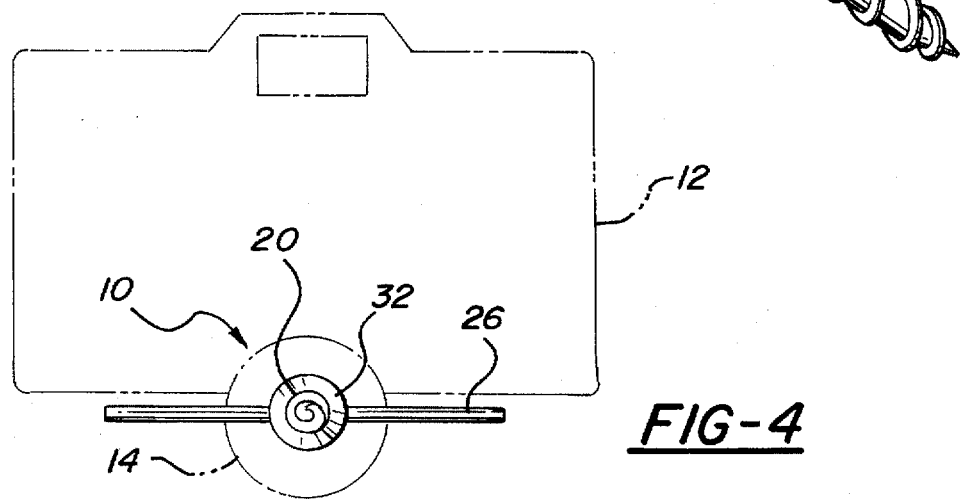
FIG. 4 is an end view taken along line 4—4 of FIG. 3.
Figure 5:
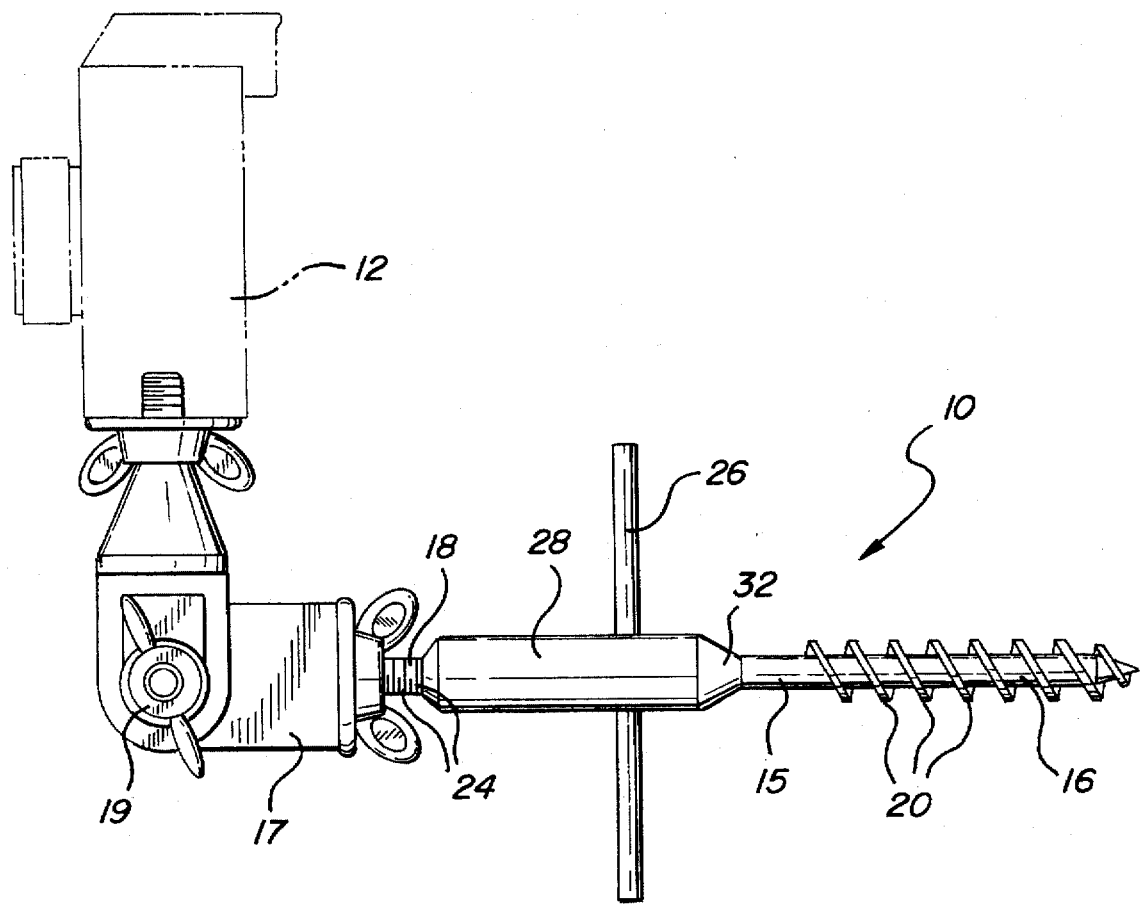
FIG. 5 is a side elevational view of the subject invention including a pivotal support mount attached thereto.

A first embodiment of a camera support constructed in accordance with the subject invention is generally shown at 10 in FIGS. 1 through 5. The camera support 10 supports a conventional camera 12, shown in phantom. The camera 12 has the usual threaded opening in an exterior wall thereof, typically in the bottom for receiving a tripod or the like. As illustrated generally, a swivel unit 14 threadingly engages the bottom of the camera 12 and presents a swivel ball which, in turn, presents an internal threaded opening identical to the threaded opening in the camera 12. Specifically in FIG. 5, a pivotal support mount 17 threadingly engages the threaded opening in the exterior wall of the camera 12 and also threadingly engages the camera support 10. The pivotal support mount 17 includes a wing nut 19 for adjusting the mounting angle of the camera 12.

The camera support 10 comprises a shaft 15 having pointed first 16 and blunt second 18 ends and a longitudinal axis extending therebetween. Self tapping anchor threads 20 are disposed on the first end 16 of the shaft 15 and extend along the axis for threadingly engaging a support structure, such as the tree 22 shown in FIG. 1. The anchor threads 20 have a coarse thread series with a large crest and thread angle and a wide pitch. The anchor threads 20 are sharp right hand threads that terminate at a sharp point at the distal end of the shaft 15. Fine machine-like support threads 24 are disposed on the second end 18 of the shaft 15 and extend along the axis for threadingly engaging the internal threaded opening in the camera 12, or in the equivalent opening in an intermediate accessory like the swivel unit 14 or pivotal mount 17. The support threads 24 are similar to the threads on a machine screw with respect to a small pitch and thread angle. The support threads 24 have a major diameter smaller than the diameter of the shaft 15.

The shaft 15 includes a center portion 28 extending between the self tapping anchor threads 20 and the machine-like support threads 24. The center portion 28 is of a larger diameter than the major diameters of the anchor threads 20 and the support threads 24. A frustoconical section 32 is juxtaposed between and connects the first end 16 and the center portion 28.

The camera support 10 also includes a cylindrical handle 26 extending transversely to opposing sides of the longitudinal axis of the shaft 15 for manually rotating and tapping the anchor threads 20 into the support structure 22. The center portion 28 includes a transverse bore 30, whereby the handle 26 is disposed within the bore 30. The handle 26 has a center portion that has a slightly larger diameter than the interior diameter of the bore 30. Hence, during assembly operation, the handle 26 is press fit into the bore 30, thereby, fictionally locking the handle 26 within the bore 30. The handle 26 and bore 30 are located between the self tapping anchor threads 20 and the machine-like support threads 24. As shown, the handle 26 extends in opposite perpendicular directions from the shaft 15. Hence, the handle 26 provides a mechanical advantage for manually rotating the camera support 10 and tapping the anchor threads 20 into the support structure 22.

An alternative embodiment is shown in FIG. 6 wherein like numerals increased by one hundred indicate like or corresponding parts. The camera support 100 comprises a shaft 115 having pointed first 116 and blunt second 118 ends and a longitudinal axis extending therebetween. Anchor threads 120 are disposed on the first end 116 of the shaft 115 and extend along the axis for threadingly engaging a support structure. The anchor threads 120 have a coarse threading that terminates at a sharp point. Machine-like support threads 124 are disposed on the second end 118 of the shaft 115 and also extend along the axis for threadingly engaging the internal threaded opening in the camera 12, or the equivalent opening in an intermediate accessory like the swivel unit 14 or pivotal support mount 17.

The shaft includes a center portion 128 extending between the anchor threads 120 and the support threads 124. The diameter of the center portion 128 is slightly larger than the major diameter of the support threads 124. A rectangular handle 126 has a threaded portion 134 for engagement with the support threads 124. The handle 126 provides a mechanical advantage for manually rotating and tapping the anchor threads 120 into the support structure 22. A nut 136 is also in threaded engagement with the support threads 124. The nut 136 abuts a camera 12 or the equivalent intermediate accessory like a swivel unit 14 or pivotal support mount 17.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

I claim:

1. A camera support (10) comprising:

a shaft (15) having first (16) and second (18) ends and a longitudinal axis extending therebetween;

anchor threads (20) disposed on said first end (16) and extending along said axis of said shaft (15);

support threads (24) disposed on said second end (18) and extending along said axis of said shaft (15);

a handle (26) extending transversely to opposing sides of said axis of said shaft (15) for manually rotating said anchor threads (20);

said anchor threads (20) being coarse self tapping threads and said support threads (24) being fine machine-type threads;

a center portion (28) extending between said anchor threads (20) and said support threads (24) with said handle (26) disposed along said center portion (28);

said center portion (28) having a larger diameter than the major diameter of said support threads (24); and a frusto-conical section (32) interconnecting said center portion (28) and said first end (16).

2. A support (10) as set forth in claim 1 including a pivotal support mount (17) threadingly engaging said support threads (24).

3. A support (10) as set forth in claim 1 wherein said handle (26) is disposed between said anchor threads (20) and said support threads (24).

4. A support (10) as set forth in claim 3 wherein said handle (26) extends symmetrically in opposite directions from said shaft (15).

5. A support (10) as set forth in claim 1 wherein said center portion (28) includes a transverse bore (30) and said handle (26) is press fit within said bore (30).

* * * * *